Jan. 15, 1929.
H. E. BUCKLEN ET AL
1,698,709
GOVERNING DEVICE FOR WIND POWER PLANTS
Filed June 17, 1926     2 Sheets-Sheet 2
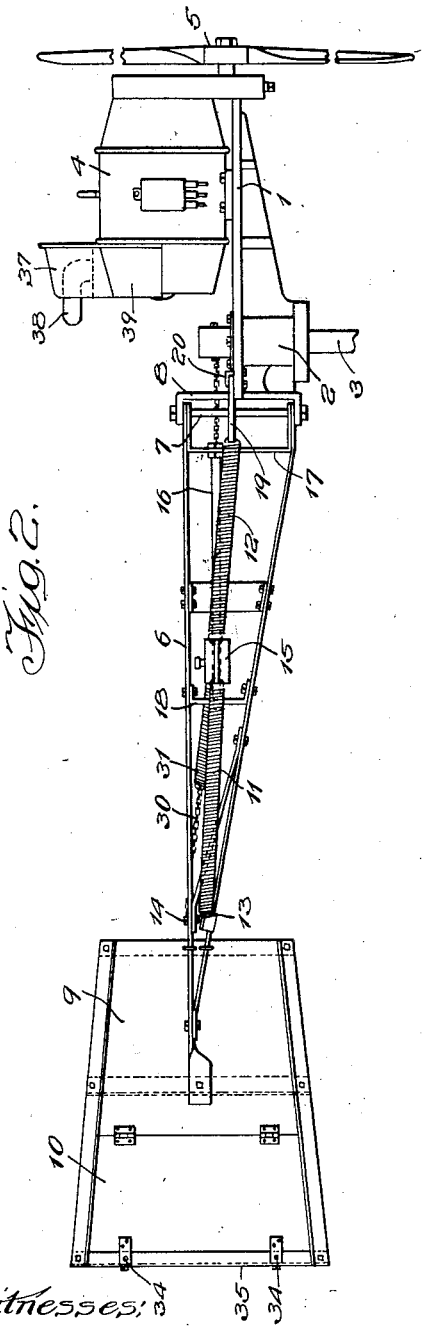
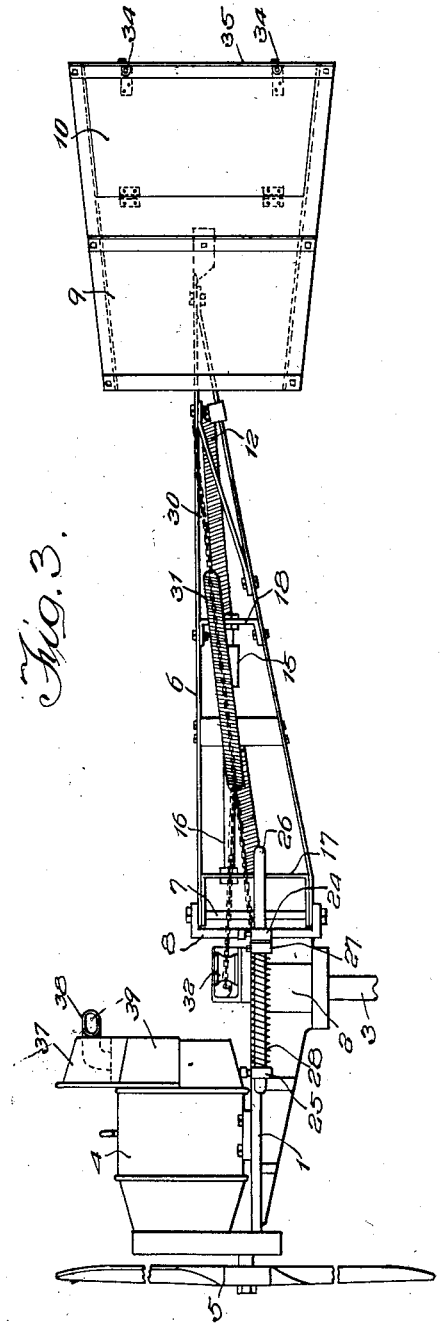
Witnesses:
William P. Kilroy
Harry R. L. White
Inventor:
Herbert E. Bucklen
Hartie O. Putt
By
Att'ys Patented Jan. 15, 1929.

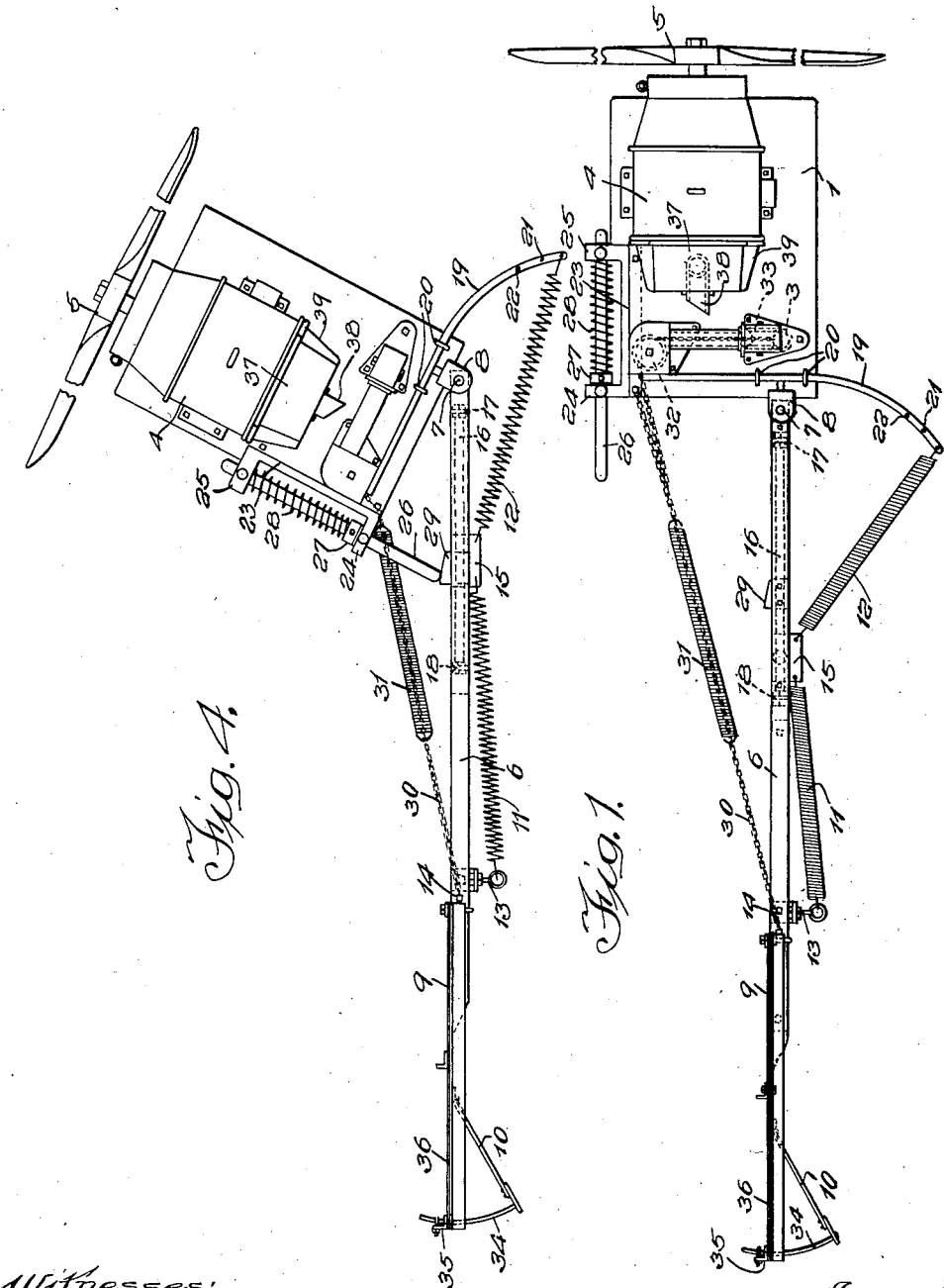

1,698,709

UNITED STATES PATENT OFFICE.

HERBERT E. BUCKLEN AND HARLIE O. PUTT, OF ELKHART, INDIANA, ASSIGNORS TO HERBERT E. BUCKLEN, OF ELKHART, INDIANA.

GOVERNING DEVICE FOR WIND-POWER PLANTS.

Application filed June 17, 1926. Serial No. 116,752.

This invention relates to governing devices for wind power plants. Wind power plants usually consist of a wind driven rotor mounted on a horizontal axis the support therefor being adapted to rotate about a vertical axis and being provided with a tail vane for keeping said rotor into the wind. Governing devices for such plants have been in use heretofore, as for instance, in the case of windmills wherein spring tension devices have been used to reduce the racing of the wind rotor so far as possible during strong winds. In order to prevent such racing the tail vane of the windmill has been permitted to oscillate relative to the wind-rotor against spring action, permitting the rotor to turn out of the wind when the wind stream exceeds a predetermined strength. However, in the use of the spring tension devices which have been employed heretofore, it has been found that as the wind rotor turns out of the wind, the decreasing area of said rotor to the wind stream and the increasing area of the tail vane to said wind stream together with the increased tension of the spring would act to turn the wind rotor back into the wind again. A point of balance was always reached in which the wind rotor would not turn farther out of the wind as said wind increased, but would continue to race to a considerable extent. In addition to racing, the mill would violently strike against its bumper stop and would thus tend to destroy itself during a high wind. In case the power plant is an electric one, the necessity for eliminating racing of the wind rotor during high winds, becomes greater. This is especially true of a plant employing an electric generator of relatively high output in wind velocities ranging from ten to twenty-five miles per hour; for, without a suitably effective and automatic control of the wind rotor, the electrical output would be destructive during high winds. Dependence on the human factor to protect the plant by pulling the same partly out of the wind during storm periods has proven unreliable and unsatisfactory. Furthermore, it is not desirable to entirely stop generating in these high winds as the energy might be urgently needed at such times.

In order to overcome the above difficulties in devices of this type which have been in use heretofore and in order to meet the above needs, we provide a governing device which is automatic in operation, is effective during storm periods for pulling the plant partly out of the wind depending upon the velocity thereof for keeping the wind rotor from racing during such periods and for permitting the continuous generation of current at below the normal generator output during such periods, and which is entirely fool-proof.

In order to carry out our invention we mount the power unit of the plant including the rotor or propeller on a turntable which is provided with a vertical axis, said propeller having the axis thereof offset relative to said vertical axis, the degree of such offset being determined by the area of propeller surface and the maximum speed at which it is desired to have said propeller run. A tail vane is pivoted to the rear of the turntable adjacent the vertical axis thereof and is further connected to the turntable through the medium of a pair of springs which, when the turntable is pivoted due to the velocity of the wind to force the propeller out of the wind, acts to swing the tail vane into the wind. This causes increased wind pressure on the wind side of the tail vane forcing it out of the wind against the tension of said springs. Such tension tends to force the propeller back into the wind again. However, these two springs are so connected together through a slidable spring anchor and are so connected to the turntable through an adjustable tension arm, that the greatest spring tension is exerted during the first part of the relative movement between the vane and the turntable, and as such movement increases, the two springs approach a parallel alignment permitting an additional stretching of the springs and a decrease in the tension thereof. The point at which this decreased tension effect occurs may be adjusted through the adjustable tension arm so as to make it occur just below the maximum speed of the propeller.

The foregoing device will thus insure against any racing of the propeller during high wind periods due to any point of balance being reached by the tension springs in which they would not permit the tail vane to pivot sufficiently to allow the turntable to move far enough out of the wind so as to reduce the speed of the propeller below its maximum amount.

In order that the operation of the propeller may continue even during the strong wind periods an adjustable spring bumper rod is mounted on the turntable and is adapted to cooperate with the vane to move the latter relative to the turntable and the propeller thereon when the latter has been forced out of the wind so as to bring the same back into the wind to keep a small amount of power going. However, the bumper will not keep the head continuously in the wind when the wind increases again, but the tail vane will again strike the bumper as the propeller is forced out of the wind and another adjustment will automatically take place.

Other and further advantages of our device will be apparent from the specification and claims wherein:

Figure 1 is a plan view of a wind electric power plant embracing a governing device of this invention;

Fig. 2 is a side elevation of Figure 1;

Fig. 3 is an elevational view from the opposite side of Figure 1 from that shown in Figure 2;

Fig. 4 is a plan view of the plant showing the relative position of the turntable and tail vane when the former has been forced to the left by a high wind bringing the propeller or rotor out of the wind and the spring bumper has forced said propeller slightly into the wind again so as to permit said propeller to generate power during such high wind.

Referring to the drawings more particularly, numeral 1 designates a turntable pivoted through a bearing 2 at the rear right corner thereof on a vertical shaft 3. A generator 4 is mounted on the turntable 1 and has its axis offset from the fulcrum provided by the bearing 2 and shaft 3, an amount determined by the diameter and area of a windwheel 5 and the maximum load or output of the generator. A movable tail vane is provided and consists of a rearwardly extending frame 6 having a pair of longitudinal elements which are vertically spaced at their forward ends and are pivotally connected through a vertical pin 7 and bracket 8 to the rear of the turntable 1 adjacent the fulcrum thereof. At the rear of the frame 6, the longitudinal elements thereof are brought together and rigidly secured to a vertical blade 9 forming the tail vane. The vane 9 is provided with a rear section 10 which is vertically hinged to the forward section thereof for a purpose that will be hereinafter described. A pair of tension springs 11 and 12 are provided. The rear end of the spring 11 is connected to an outwardly extending eye bolt 13 on an adjustable clamp 14 on the frame 6. The forward end of the spring 11 and the rearward end of the spring 12 are connected respectively to the opposite outer corners of a block 15. The block 15 is slidably mounted on a rod 16, the ends of which are supported by longitudinally spaced braces 17 and 18 of the frame 6. The block 15 is provided with impregnated wood bushings to prevent excessive wear and is lubricated by a suitable grease cup. The rod 16 is preferably of non-rusting material such as brass. The forward end of the spring 12 is connected near the outer end of an adjustable tension arm 19 which extends outwardly from the right of the turntable 1 near the afterpart thereof and is suitably secured thereto by U-bolts 20. The outer portion of the arm 19 is curved slightly to the rear to prevent interference therewith by the spring 12 during relative movement between the turntable and the tail vane.

The wind pressure against the propeller 5 increases the rotation thereof and due to the fact that the same is offset from the fulcrum of the turntable tends to force said propeller out of the wind and simultaneously through the medium of the tension springs 11 and 12 tends to swing the tail vane into the wind. This causes increased wind pressure on the wind side of the tail vane forcing the latter out of the wind against the action of said spring. The tension on the springs 11 and 12 is transmitted through the adjustable arm 19 to the turntable tending to pull the propeller back into the wind. The tension created by the initial part of such relative swinging between the turntable 1 and the tail vane is borne by the spring 12. As the vane swings further around relative to the table 1 the two springs 11 and 12 approach alignment and the spring 11 assumes some of the tension, thereby decreasing the tension of the two springs as a whole. This is accomplished through the slidable block 15 which is permitted to slide forwardly as the two springs approach such alignment. The tension of the spring 11 may be adjusted by longitudinally positioning the clamp 14 on the frame 6. The tension of the spring 12 may be adjusted by connecting said spring in either one of the holes 21 or 22. The angularity of the spring 12, that is, the leverage which may be exerted by the turntable 1 through means of the two springs and the arm 19 may be adjustably varied by adjusting the outward position of said arm. The foregoing adjustments as to tension and leverage may be made so that the decreasing tension effect, that is, the point at which the spring 11 assumes its share of the tension due to the sliding of the block 15 when the two springs approach alignment, occurs just below maximum generator load or output.

Means are provided for forcing the propeller back into the wind during the high wind period when the propeller has been forced out of the wind sufficiently for the decreased tension effect of the springs 11 and 12 to occur so that such springs having approached alignment are unable to return the propeller back into the wind. Without such a means the propeller might be forced out of the wind during high wind periods in a manner which would prevent the continuous operation of said propeller during such period. To this end a U-shaped casting 23 is mounted on the left side of the table 1 and is provided with longitudinally spaced bearings 24 and 25 for slidably containing a rod 26. The bearings 24 and 25 are preferably bushed with hard wood and provided with grease cups for lubrication. A collar 27 is secured on the rod 26 between the bearings 24 and 25 and is normally held against the former bearing by a spring 28 surrounding said rod. The collar 27 is adjustably secured on the rod 26 through means of a set screw. The rod 26 which is normally maintained in rearwardly projected position is adapted to abut a plate 29 secured on the frame 6 for retarding the extreme swinging movement between the table 1 and the tail vane thus tending to force the propeller back into the wind and permitting the plant to continue generation during high wind velocities.

A pullout chain 30 is connected to the frame 6 by a bolt or otherwise, threaded through a buffer spring 31, the purpose of which will be hereinafter described, and is led over an offset pulley 32 on the table 1, thence to a pulley 33 on said table adjacent the fulcrum thereof and downwardly to a windlass or other like device located at the base of the tower of the plant or other convenient point.

In order to absorb the shock of a shifting gust of wind striking the vane and causing a sudden jerking of the propeller into the wind, means are provided consisting of the bumper spring 31 aforementioned, the rearward end of which is secured to the pullout chain 30 and the forward end of which is secured to the casting 23 by a suitable chain at the rear thereof. The chain 30 pulls directly on the frame 6 for winding the propeller out of the wind and during such winding the spring 31 and the chain connection therefrom to the casting 23 slack down out of the way.

In order to minimize the size and weight of the tail vane and at the same time retain the effectiveness of a larger vane area the rear half 10 is hinged to the rest of the vane 9, as previously described, and is provided with adjustment rods 34 and locking brackets 35 mounted on a frame 36 normally surrounding the portion 10 and secured to the forward portion of the vane 9. By adjusting the rearward half of the vane to the position shown in Figure 1 or any other intermediate position, not only is the effective pressure against it on the normal wind side increased, but the pressure against the vane on the opposite side is decreased due to the lesser effective area exposed. The tendency of a sudden shift of wind to jerk the propeller into the wind is thus reduced, and the tendency to excessively high current peaks for short intervals of time due to such jerks is correspondingly reduced.

In order to more effectively cool the generator 4, the casing thereof is open (not shown) at the bottom, and at the top is provided with a rearwardly directed nozzle 37 and exit passage 38 similar to those shown and described in connection with the copending application of Herbert E. Bucklen Serial No. 78,274, filed December 30, 1925, for wind driven generator. In this case said nozzle 37 and passage 38 are provided in a compact unit including arcuate flanges 39 at the lower edges of said nozzle so that said unit may be readily attached to a standard generator casing.

In operation, the vane 6 is normally disposed at right angles to the rear end of turntable 1 so as to hold the wheel 5 in the wind. In the event that the velocity of the wind exceeds the predetermined maximum, the pressure on the wheel and on the end of the generator casing 4 will cause the turntable 1 to turn about its pivot 3 due to the fact that the wheel and the generator are positioned at the forward portion of the turntable and adjacent the corner thereof which is diagonally opposite to the corner adjacent which the pivot 3 is located. As the turntable 1 turns about pivot 3, the elongated casing 4 of the generator, as well as the elongated side of the turntable, is subjected to the wind pressure thus increasing the leverage effect of the turntable when turning upon its pivot. If the wind velocity is exceptionally high, the turntable is moved about its pivot into the position illustrated in Fig. 4. In this position, further movement of the turntable is resisted by the spring 28 and associated parts thus holding the wheel at an angle to the wind so as to be rotated thereby. Increased velocity of the wind will result in increased pressure on the generator casing 4 and the turntable, turning the turntable further about its pivot 3 and correspondingly decreasing the angle of the wheel to the direction of travel of the wind. In extremely high winds, where it would be unsafe or undesirable to have the generator operate, the turntable is moved about its pivot into such position as to turn the wheel completely out of the wind, or practically so, thus stopping operation of the generator completely or reducing the speed of rotation of the wheel sufficiently to effectually eliminate all possibility of damage to the generator. When the velocity of the wind decreases, the spring 28 acts to turn the turntable 1 about its pivot in such direction as to increase the angle between the wind wheel and the direction of flow of the wind in accordance with decrease in wind velocity. This provides a very simple and automatic control whereby rotation of the generator rotor at proper speed is insured at all times and injury to the generator due to being driven at excessively high speed is effectually eliminated. It is also to be noted that this automatic moving of the propeller into and out of the wind in accordance with variations in the wind velocity is not dependent in any way upon the rotation of the propeller. That is to say, there are no parts driven from the propeller which function in the shifting of the turntable in accordance with variations in wind velocity. This feature of applicant's construction is of importance as it enables the entire available wind power to be utilized for driving the generator, which is an important consideration in plants of this character, particularly in localities where steady winds of low velocity are encountered.

It is to be understood that the foregoing governing device may be used in connection with any wind driven power plant whether electrical or mechanical.

We are aware that many changes may be made and many details varied throughout a wide range without departing from the principles of this invention and we do not propose to be limited to the details shown or described.

We claim:—

1. In a wind driven device, the combination comprising a rotatable mount, a rotor thereon having its axis offset from the fulcrum of said mount, a tail vane hinged to said mount, an outwardly extending arm on said mount and a spring connection between said arm and vane for retarding the angular movement of said vane relative to said mount, said connection including means for reducing the tension thereof after said movement has proceeded a predetermined amount.

2. In a wind driven device, the combination comprising a rotatable mount, a rotor thereon, a tail vane hinged to said mount, and a spring connection normally acting to retard the angular movement of said vane relative to said mount, said connection including means for reducing the tension thereof after said movement has proceeded a predetermined amount.

3. In a wind driven device, the combination comprising a rotatable mount, a rotor thereon, a tail vane pivoted to said mount, a spring connection normally acting to retard the angular movement of said vane relative to said mount, said connection including means for reducing the tension thereof after said movement has proceeded a predetermined amount, and a spring bumper for retarding said angular movement beyond said predetermined amount.

4. In a wind driven device, the combination comprising a rotatable mount, a rotor thereon, a tail vane pivoted to said mount, a spring connection normally acting to retard the angular movement of said vane relative to said mount, said connection including means for reducing the tension thereof after said movement has proceeded a predetermined amount, and resilient means for automatically reversing said angular movement after it has reached said predetermined amount.

5. In a wind driven device, the combination comprising a rotatable mount, a rotor thereon having its axis offset from the fulcrum of said mount, a tail vane hinged to said mount, an outwardly extending arm on said mount, a connecting member longitudinally slidable on said tail vane, a spring having one end rigidly connected to said vane and the other end connected to said member, and a second spring having one end also connected to said member and the other end connected to said arm.

6. In a wind driven device, the combination comprising a rotatable mount, a rotor thereon, a tail vane hinged to said mount, an outwardly extending arm on said mount, a connecting member longitudinally slidable on said tail vane, a spring having one end rigidly connected to said vane and the other end connected to said member, and a second spring having one end also connected to said member and the other end connected to said arm.

7. In a wind driven device, the combination comprising a rotatable mount, a rotor thereon having its axis offset from the fulcrum of said mount, a tail vane pivoted to said mount, an outwardly extending arm on said mount, a connecting member slidably mounted on said vane, a tension spring connected to said vane and said member for retarding the movement thereof in one direction, a second spring connected to said member and said arm, and a spring bumper on said mount adapted to cooperate with said vane for retarding angular movement between said vane and mount beyond a predetermined amount.

8. In a wind driven device, the combination comprising a rotatable mount, a rotor thereon, a tail vane pivoted to said mount, a slidable connecting member on said vane, a spring having one end connected to said vane and the other end connected to said member, and a second spring having one end also connected to said member and the other end connected to said mount at a point offset from the pivot of said vane thereon.

9. In a wind driven device including a turntable and a wind wheel mounted thereon, a vane hinged to the turntable, means limiting movement of the vane about its hinge axis in one direction, and yielding means resisting movement of the vane in the other direction, the maximum force of said yielding means being exerted when the vane is in full operative position, the force exerted on the vane by the yielding means decreasing as the vane moves in said other direction about its hinge axis.

10. In a wind driven device including a turntable and a wind wheel mounted thereon, a vane hinged to the turntable, a connection between the vane and the turntable including a tension spring connected to the vane and normally exerting side pull thereon, and means for varying the effective point of connection of the spring to the vane.

11. In a wind driven device including a turntable and a wind wheel mounted thereon, a vane hinged to the turntable, a connection between the vane and the turntable including a tension spring connected to the vane and normally exerting side pull thereon, and means for automatically varying the effective point of connection of the spring to the vane in accordance with movement of the vane about its hinge axis in a direction away from the spring.

12. In a wind driven device including a turntable and a wind wheel mounted thereon, a vane hinged to the turntable, a connection between the vane and the turntable including a tension spring connected to the vane and normally exerting side pull thereon, and means for decreasing the distance between the hinge axis of the vane and the effective point of connection of the spring to the vane in accordance with movement of the vane about its hinge axis in a direction away from the spring.

13. In a wind driven device including a turntable and a wind wheel mounted thereon, a vane hinged to the turntable, a connection between the vane and the turntable including a tension spring connected to the vane and normally exerting side pull thereon, and means for shifting the effective point of connection of the spring to the vane toward and away from the hinge axis of the vane in accordance with movement of said vane about its hinge axis away from and toward the spring.

14. In a wind driven device, a turntable, a wind wheel mounted thereon, and automatically yielding means for normally holding the wheel in the wind, said means acting with maximum force when the wheel is fully in the wind and with decreasing force as the wheel is moved out of the wind.

In witness whereof, we hereunto subscribe our names this 26th day of May, 1926.

HERBERT E. BUCKLEN.
HARLIE O. PUTT.